United States Patent
Sah

(10) Patent No.: US 9,411,659 B2
(45) Date of Patent: Aug. 9, 2016

(54) DATA PROCESSING METHOD USED IN DISTRIBUTED SYSTEM

(71) Applicant: SAMSUNG SDS CO., LTD., Seoul (KR)

(72) Inventor: Sudhakar Sah, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 3 days.

(21) Appl. No.: 14/458,848

(22) Filed: Aug. 13, 2014

(65) Prior Publication Data

US 2015/0052536 A1 Feb. 19, 2015

(30) Foreign Application Priority Data

Aug. 13, 2013 (KR) .................. 10-2013-0096118

(51) Int. Cl.
*G06F 9/46* (2006.01)
*G06F 9/50* (2006.01)
*G06F 9/52* (2006.01)

(52) U.S. Cl.
CPC .............. *G06F 9/5083* (2013.01); *G06F 9/505* (2013.01); *G06F 9/52* (2013.01); *G06F 2209/5017* (2013.01)

(58) Field of Classification Search
CPC .......... G06F 9/505; G06F 9/4881; G06F 9/52
USPC .......................................... 718/102, 105, 104
See application file for complete search history.

(56) References Cited

U.S. PATENT DOCUMENTS 8,373,710 B1 * 2/2013 Vij .................... G06F 9/5044 345/502
8,386,750 B2 * 2/2013 Parker ................ G06F 12/0284 711/170

(Continued)

FOREIGN PATENT DOCUMENTS

JP 2005-56201 A 3/2005
KR 10-2011-0075295 A 7/2011

(Continued)

OTHER PUBLICATIONS

Communication dated Apr. 21, 2015 issued by the Korean Intellectual Property Office in counterpart Application No. 10-2013-0096118.

(Continued)

*Primary Examiner* — Phillip H Nguyen
(74) *Attorney, Agent, or Firm* — Sughrue Mion, PLLC

(57) ABSTRACT

Provided is a data processing method which can increase data processing speed without adding a new node to a distributed system. The data processing method may include: calculating a conversion number of cores corresponding to a number of processing blocks included in a graphics processing unit (GPU) of a node of a distributed system; calculating a adding up number of cores by adding up a number of cores included in a central processing unit (CPU) of the node of the distributed system and the conversion number of cores; splitting job data allocated to the node of the distributed system into a number of job units data equal to the adding up number of cores; and allocating a number of job units data equal to the number of cores included in the CPU to the CPU of the node of the distributed system and a number of job units data equal to the conversion number of cores to the GPU of the node of the distributed system.

12 Claims, 9 Drawing Sheets

(56) References Cited

U.S. PATENT DOCUMENTS

| | | | |
|---|---|---|---|
| 2003/0169269 A1* | 9/2003 | Sasaki | G06F 9/5066 345/581 |
| 2011/0022817 A1* | 1/2011 | Gaster | G06F 9/5044 711/202 |
| 2011/0057937 A1* | 3/2011 | Wu | G06T 1/00 345/505 |
| 2011/0161978 A1* | 6/2011 | Jang | G06F 9/505 718/104 |
| 2012/0057751 A1* | 3/2012 | Liu | H04N 7/18 382/103 |
| 2012/0079498 A1 | 3/2012 | Kim et al. | |
| 2012/0262493 A1* | 10/2012 | Tsai | G06T 1/20 345/667 |
| 2013/0010864 A1* | 1/2013 | Teng | H04N 19/176 375/240.12 |
| 2014/0189708 A1 | 7/2014 | Lee et al. | |

FOREIGN PATENT DOCUMENTS

| | | |
|---|---|---|
| KR | 10-2012-0031759 A | 4/2012 |
| KR | 10-2013-0019674 A | 2/2013 |
| KR | 10-1245994 B1 | 3/2013 |

OTHER PUBLICATIONS

Farivar, Reza et al., "MITHRA: Multiple data Independent Tasks on a Heterogeneous Resource Architecture," Department of Computer Science, University of Illinois at Urbana-Champaign, Aug. 31, 2009, pp. 1-10.

He, Chen et al., "CUDA Performance Study on Hadoop MapReduce Clusters," University of Nebraska-Lincoln, Aug. 2001, pp. 1-20.

Communication dated Oct. 30, 2015 issued by the Korean Intellectual Property Office in counterpart Patent Application No. 10-2013-0096118.

* cited by examiner

DATA PROCESSING METHOD USED IN DISTRIBUTED SYSTEM

This application claims priority from Korean Patent Application No. 10-2013-0096118 filed on Aug. 13, 2013 in the Korean Intellectual Property Office, the disclosure of which is incorporated herein by reference in its entirety.

BACKGROUND OF THE INVENTION

1. Field of the Invention

The present invention relates to a data processing method used in a distributed system.

2. Description of the Related Art

Hadoop and MapReduce are technologies that can be used to implement distributed computing. In these technologies, an increase in the size of a cluster leads to an increase in data processing speed. However, increase in the the size of the cluster increases other complexities like increases power and space requirement. Therefore, a technology for increasing data processing speed without adding a new node to the cluster is required.

SUMMARY OF THE INVENTION

Aspects of the present invention provide a data processing method which can increase data processing speed without adding a new node to a distributed system.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a data processing method including: calculating a conversion number of cores corresponding to a number of processing blocks included in a graphics processing unit (GPU) of a node of a distributed system; calculating a adding up number of cores by adding up a number of cores included in a central processing unit (CPU) of the node of the distributed system and the conversion number of cores; splitting job data allocated to the node of the distributed system into a number of job units data equal to the adding up number of cores; and allocating a number of job units data equal to the number of cores included in the CPU to the CPU of the node of the distributed system and a number of job units data equal to the conversion number of cores to the GPU of the node of the distributed system.

According to another aspect of the present invention, there is provided a data processing method including: calculating a conversion number of first-type processors corresponding to a number of second-type processors included in a node of a distributed system; calculating a adding up number of first-type processors by adding up a number of first-type processors included in the node of the distributed system and the conversion number of first-type processors; splitting job data allocated to the node of the distributed system into a number of job data unit equal to the adding up number of first-type processors; allocating a number of job units data equal to the number of first-type processors included in the node of the distributed system to the first-type processors of the node of the distributed system; and allocating a number of job units data equal to the conversion number of first-type processors to the second-type processors of the node of the distributed system, wherein the job units data equal to the conversion number of the first-type processors are split into a plurality of data blocks whose sizes are respectively proportional to throughputs of the second-type processors per unit of time, and the data blocks are allocated to the second-type processors, respectively.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
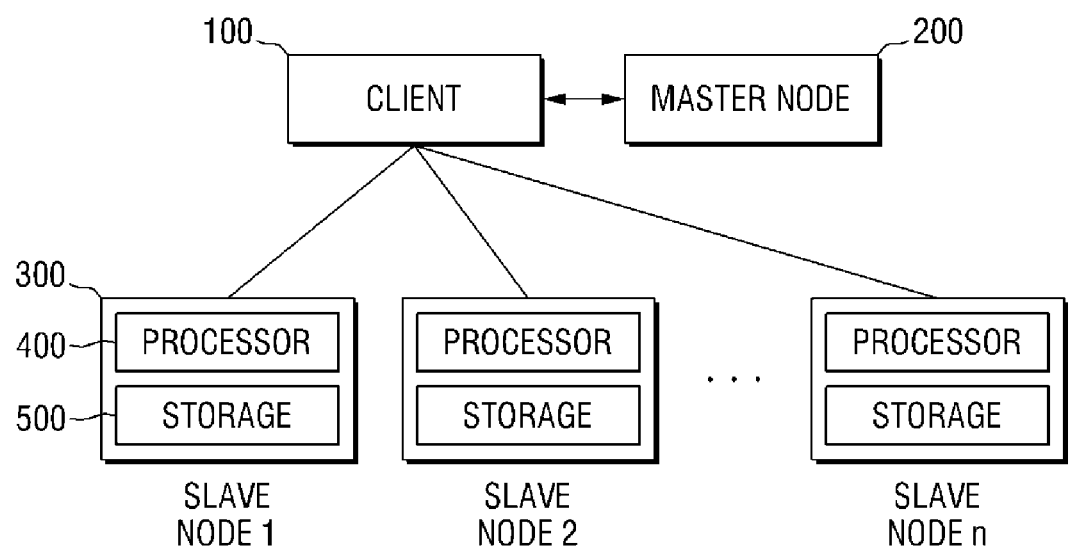
FIG. 1 is a schematic diagram of a distributed system according to an embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that, when an element is referred to as being "connected to" or "coupled" to another element, it can be directly connected or coupled to the other element or intervening elements may be present. In contrast, when an element is referred to as being "directly connected to" or "directly coupled" to another element, there are no intervening elements present. Like numbers refer to like elements throughout. As used herein, the term "and/or" includes any and all combinations of one or more of the associated listed items.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, and/or elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic diagram of a distributed system according to an embodiment of the present invention.

Referring to FIG. 1, the distributed system according to the current embodiment may include a client 100, a master node 200, and slave nodes 300. A cluster that forms the distributed system may include one or more master nodes 200 and one or more slave nodes 300. In FIG. 1, one master node 200 and n slave nodes 300 are illustrated. In some embodiments of the present invention, the cluster may be, e.g., a Hadoop cluster employing Hadoop architecture.

The client 100 may transmit data to be processed to the cluster and retrieve or read the result of processing the data. When transmitting the data to be processed to the cluster, the client 100 according to embodiments of the present invention may specify in which way the data should be processed.

The client 100 may be connected to the master node 200 or the slave nodes 300 and exchange various information with the master node 200 or the slave nodes 300. In an example, the client 100 may request the master node 200 to store data to be processed, and the master node 200 may designate a slave node 300, which will store the data, for the client 100. Then, the client 200 may store the data to be processed in the slave node 300 designated by the master node 200. In another example, the client 100 may request the master node 200 to calculate data stored in the cluster, and the master node 200 may generate a job for calculating the data stored in the cluster and transmit the job to a slave node 300. Then, the client 100 may receive a value of the result of processing or calculating the data from the slave node 300.

The client 100, the master node 200, and the slave nodes 300 may be connected to one another through a network. According to embodiments of the present invention, the network may be, but is not limited to, a wireless network such as WiFi or a wired network such as a local area network (LAN). In the current embodiment of the present invention, each of the client 100, the master node 200, and the slave nodes 300 may be a single server. In another embodiment of the present invention, at least one of the client 100, the master node 200, and the slave nodes 300 may be included in one server that plays multiple roles. Here, the server may be a physical server itself or a server run on a personal computer (PC) (e.g., a desktop computer, a notebook computer, etc.), a tablet, and a smartphone. In particular, in the current embodiment of the present invention, the server may be a rack server.

Figure 2:
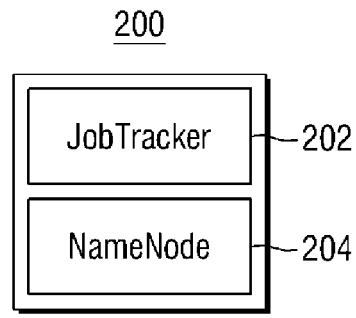
FIG. 2 illustrates a master node of FIG. 1.
Figure 3:
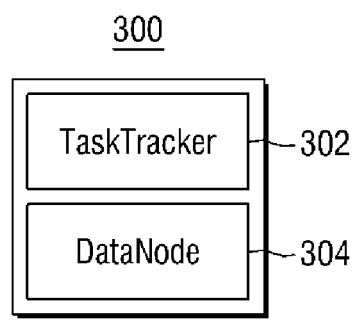
FIG. 3 illustrates a slave node of FIG. 1.

FIG. 2 illustrates the master node 200 of FIG. 1. FIG. 3 illustrates a slave node 300 of FIG. 1. One or more master nodes 200 and one or more slave nodes 300 that form one cluster can be described from a perspective of processing distributed data and a perspective of storing distributed data. The perspective of processing distributed data includes generating a job for processing data stored in the cluster and processing the data stored in the cluster using the generated job. On the other hand, the perspective of storing distributed data includes storing data to be processed in the cluster and reading the result of processing the data from a slave node 300 using the client 100. In a Hadoop cluster according to an embodiment of the present invention, MapReduce may be taken into consideration in the perspective of processing distributed data, and a Hadoop distributed file system (HDFS) may be taken into consideration in the perspective of storing distributed data. The master node 200 and the slave node 300 will now be described from these perspectives with reference to FIGS. 2 and 3.

Referring to FIG. 2, the master node 200 may include a JobTracker 202 and a NameNode 204. In the current embodiment, the JobTracker 202 and the NameNode 204 may be server instances generated in the master node 200. The Job-Tracker 202 is a server instance corresponding to the perspective of processing distributed data. For example, when the client 100 makes a request to process data stored in the cluster, the JobTracker 202 may generate a job for calculating the data and transmit the generated job to a slave node 300. The NameNode 204 is an instance corresponding to the perspective of storing distributed data. For example, when the client 100 makes a request to store data, the NameNode 204 may designate a slave node 300 which will store the data.

Referring to FIG. 3, the slave node 300 may include a TaskTracker 302 and a DataNode 304. In the current embodiment of the present invention, the TaskTracker 302 and the DataNode 304 may be server instances generated in the slave node 300. The TaskTracker 302 is an instance corresponding to the perspective of processing distributed data. For example, the TaskTracker 302 may process data stored in the slave node 300 at the request of the client 100. The DataNode 304 is an instance corresponding to the perspective of storing distributed data. For example, the DataNode 304 may store data, which is to be processed, at the request of the client 100.

Figure 4:
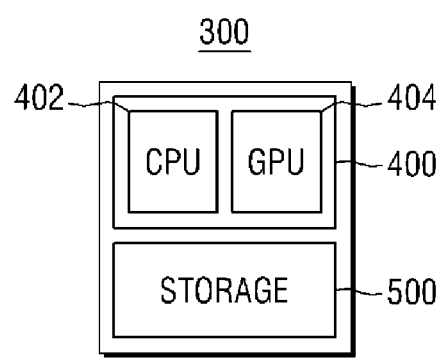
FIG. 4 illustrates the physical structure of the slave node of FIG. 1.

FIG. 4 illustrates the physical structure of the slave node 300 of FIG. 1. The slave node 300 may include a processor 400 which processes data stored in the cluster and a storage 500 which stores data to be processed or the result of processing data. The processor 400 may include at least one of a central processing unit (CPU) 402 and a graphics processing unit (GPU) 404. In some embodiments of the present invention, the processor 400 may include a plurality of CPUs 402 and a plurality of GPUs 404. In some embodiments of the present invention, the processor 400 may be a semiconductor device such as a field programmable gate array (FPGA). The storage 500 may include a hard disk drive (HDD), a solid state drive (SSD), and an optical drive such as a compact disc (CD) or a digital video disc (DVD). Although not illustrated in FIG. 4, the slave node 300 may include a memory such as a random access memory (RAM).

Figure 5:
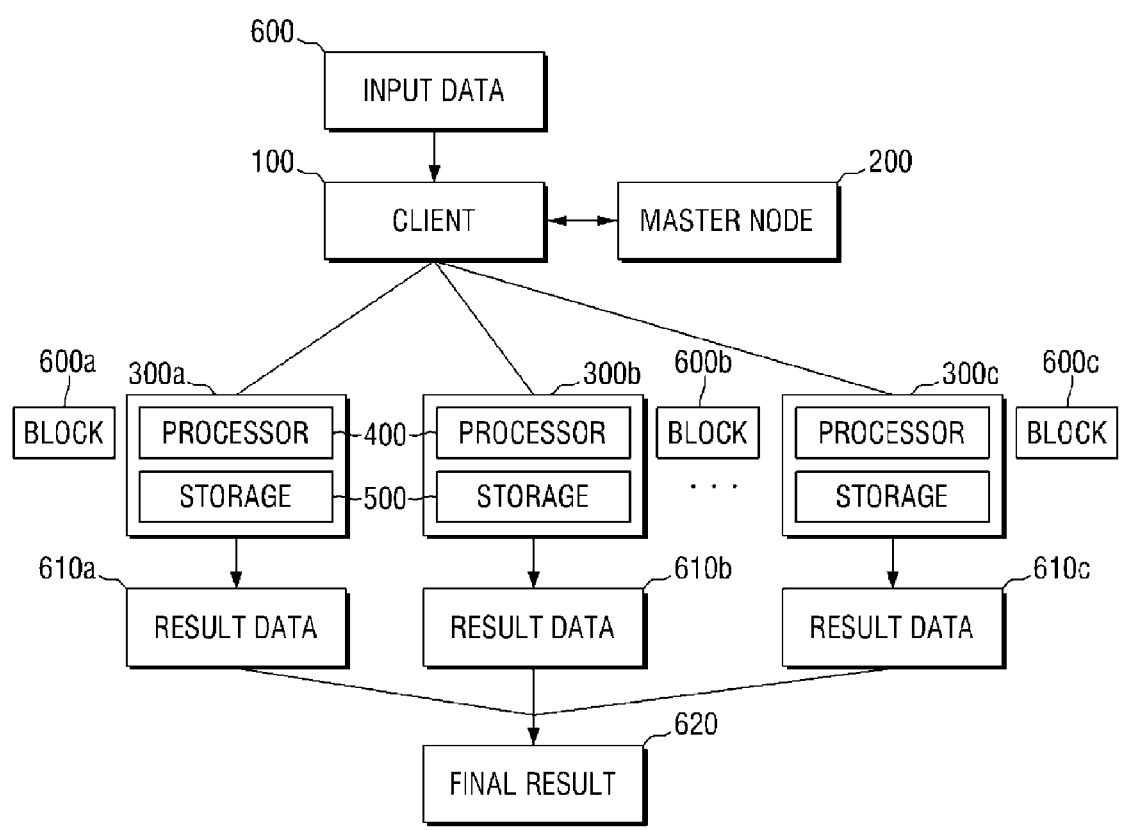
FIG. 5 is a schematic diagram illustrating a data processing method according to an embodiment of the present invention.

FIG. 5 is a schematic diagram illustrating a data processing method according to an embodiment of the present invention.

Referring to FIG. 5, a client 100 may receive, e.g., from a user, input data 600 to be processed. The input data 600 may be split into one or more job data blocks 600a through 600c that can be processed in a distributed manner, in other words, processed by a plurality of slave nodes. In the embodiment of FIG. 5, the input data 600 is split into three job data blocks 600a through 600c.

The job data blocks 600a through 600c are stored in a plurality of slave nodes 300a through 300c and then processed by processors 400 of the slave nodes 300a through 300c, respectively. The slave nodes 300a through 300c produce the results of processing (e.g., calculating) the job data blocks 600a through 600c as result data 610a through 610c and store the result data 610a through 610c in their storages 500, respectively. In the current embodiment, any one of the slave nodes 300a through 300c that form a cluster may collect the result data 610a through 610c stored in the storages 500 of the slave nodes 300a through 300c and produce one final result 620, and the client 100 may retrieve or read the final result 620.

Figure 6:
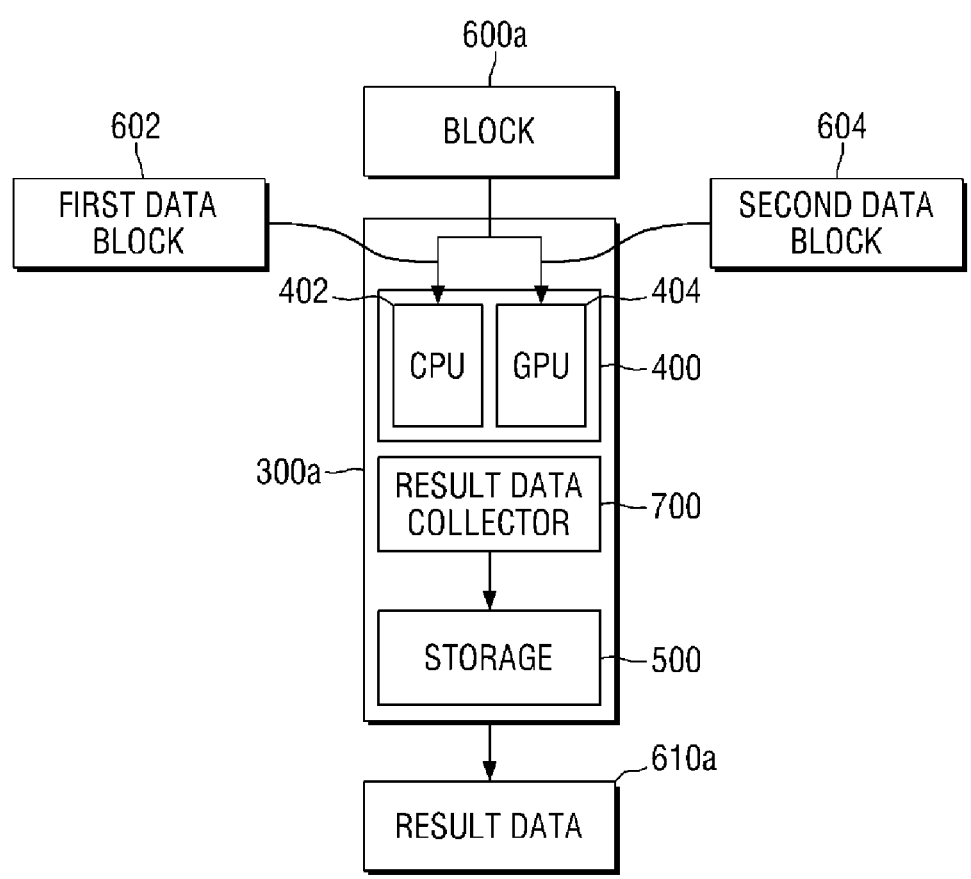
FIG. 6 illustrates a data processing process of a slave node according to an embodiment of the present invention.

FIG. 6 illustrates a data processing process of a slave node according to an embodiment of the present invention.

Referring to FIG. 6, a slave node 300a may receive a job data block 600a. In the current embodiment of the present invention, the slave node 300a may store the job data block 600a in its storage 500 or in a memory. The slave node 300a illustrated in FIG. 6 may include a CPU 402 and a GPU 404 as a processor 400. In some embodiments of the present invention, the CPU 402 may include a plurality of cores, and the GPU 404 may be provided in a plurality.

The job data block 600a into which input data 600 has been split for distributed processing may additionally be split into a first data block 602 to be processed by the CPU 402 and a second data block 604 to be processed by the GPU 404. Since the job data block 600a is additionally split into the first data block 602 and the second data block 604 within one slave node 300a and then processed by the CPU 402 and the GPU 404, it can be processed (calculated) with increased speed. The process of splitting the input data 600 into the first data block 602 to be processed by the CPU 402 and the second data block 604 to be processed by the GPU 404 will be described later with reference to FIGS. 8 through 10.

Referring continuously to FIG. 6, the slave node 300a may further include a result data collector 700. In the current embodiment of the present invention, the result data collector 700 may be provided separate from the CPU 402. In another embodiment of the present invention, a core of the CPU 402 may operate as the result data collector 700. The result data collector 700 may collect the processing result of the CPU 402 and the processing result of the GPU 404 and produce result data 610a.

Figure 7:
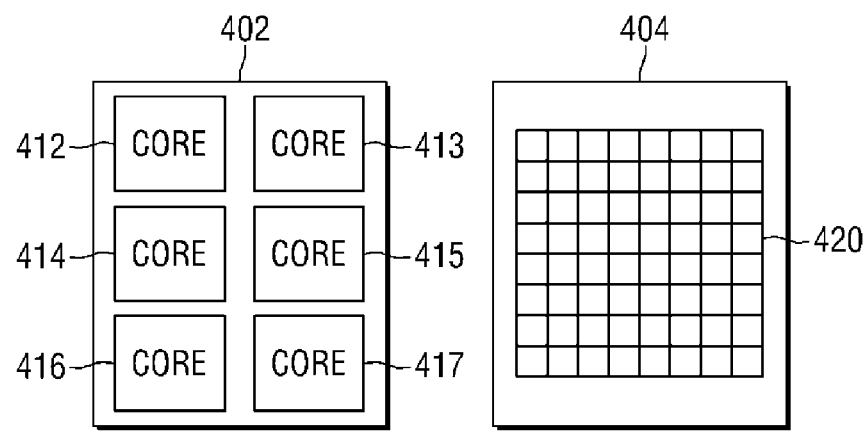
FIG. 7 illustrates a central processing unit (CPU) and a graphics processing unit (GPU) included in a slave node of the distributed system according to an embodiment of the present invention.
Figure 8:
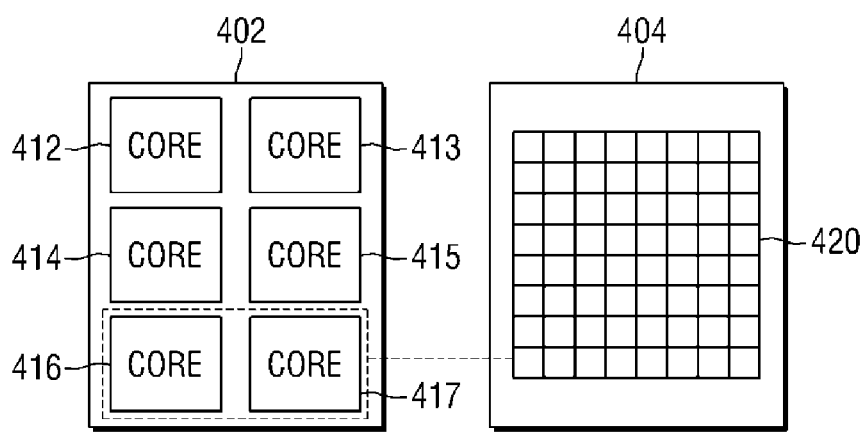
FIG. 8 illustrates a process of calculating the conversion number of cores corresponding to the number of processing blocks of a GPU included in a slave node of the distributed system according to an embodiment of the present invention.

FIG. 7 illustrates a CPU 402 and a GPU 404 included in a slave node 300a of the distributed system according to an embodiment of the present invention. FIG. 8 illustrates a process of calculating the number of cores (hereinafter, referred to as a conversion number of cores) corresponding to the number of processing blocks of the GPU 404 included in the slave node 300a of the distributed system according to an embodiment of the present invention.

Referring to FIG. 7, the CPU 402 according to the current embodiment of the present invention may include a plurality of cores 412 through 417, and the GPU 404 may include a plurality of processing blocks included in a GPU grid 420. To further improve the data processing speed of the distributed system, the slave node 300a according to the current embodiment of the present invention uses both the CPU 402 and the GPU 404. Here, it is required to appropriately adjust a ratio of data processed by the CPU 402 and data processed by the GPU 404 in order to satisfactorily improve the data processing speed.

In the current embodiment of the present invention, to split a job data block 600a into a first data block 602 to be processed by the CPU 402 and a second data block 604 to be processed by the GPU 404, the conversion number of cores corresponding to the number of processing blocks included in the GPU 404 of the slave node 300a is calculated. In other words, the job data block 600a is split into the first data block 602 and the second data block 604 by converting the throughput of the GPU 404 for a predetermined period of time in a processor 400 of the slave node 300a into the number of CPU cores of the processor 400 of the slave node 300a. Here, the size of the first data block 602 corresponds to the number of cores included in the CPU 402 of the slave node 300a, and the size of the second data block 604 corresponds to the conversion number of cores.

In the current embodiment of the present invention, for example, referring to FIG. 8, the conversion number of cores corresponding to the number of processing blocks included in the GPU 404 of the slave node 300a may be two. In some embodiments, this may indicate that the processing power or performance of the GPU 404 corresponds to the processing power or performance of two cores of the CPU 402.

A method of calculating the conversion number of cores corresponding to the number of processing blocks included in the GPU 404 of the slave node 300a will now be described in detail. To calculate the conversion number of cores, an average number of processing blocks included in one GPU 404 of the slave node 300a is calculated. To this end, a total number of processing blocks of all GPUs 404 is divided by the number of GPUs 404 included in the slave node 300a. Assuming that $N_G$ is the number of GPUs 404 included in the slave node 300a and that $G_C$ is the sum of the numbers of processing blocks included in the GPUs 404 of the slave node 300a, an average number $G_{CAVG}$ of processing blocks included in one GPU 404 can be calculated by Equation (1):

$$G_{CAVG}=G_C/N_G \qquad (1).$$

Then, a conversion number $GCI_{CAVG}$ of cores corresponding to the number of processing blocks included in the GPU 404 of the slave node 300a is calculated. The conversion number $GCI_{CAVG}$ of cores may be calculated by a core table such as [Table 1] created based on the average number $G_{CAVG}$ of processing blocks included in one GPU 404 and may be represented by an integer.

TABLE 1

| Number of Processing Blocks | Conversion number of Cores ($GCI_{CAVG}$) |
|---|---|
| Greater than 0 to 96 | 1 |
| Greater than 96 to 192 | 2 |
| Greater than 192 to 384 | 3 |
| Greater than 384 to 512 | 4 |
| Greater than 512 to 1024 | 5 |
| Greater than 1024 to 2048 | 6 |

In some embodiments, the conversion number $GCI_{CAVG}$ of cores calculated as described above can be corrected by reflecting a weight allocated to the GPU 404 according to attributes of job data. For example, the processing speed of the CPU 402 and the processing speed of the GPU 404 for the same job data may be compared. Then, a speed improvement index PI indicating the degree of improvement in the processing speed of the GPU 404 may be reflected in the conversion number $GCI_{CAVG}$ of cores. If the GPU 404 requires a time of 10 to process a job when the CPU 402 requires a time of 1000 to process the job, the degree of improvement in the processing speed of the GPU 404 may be 100 times (100×). The speed improvement index PI representing this concept may be calculated by [Table 2] and represented by an integer.

TABLE 2

| Speed Improvement | Speed Improvement Index (PI) |
|---|---|
| 0-50x | 1 |
| 50x-100x | 2 |
| 100x-150x | 3 |
| 150x-200x | 4 |
| 200x-300x | 5 |
| >300x | 6 |

Based on [Table 2], the corrected conversion number $N_{Peq}$ of cores can be calculated by Equation (2):

$$N_{Peq} = GCI_{CAVG} \times PI \tag{2}$$

Assuming that the number of cores included in the CPU 402 of the slave node 300a is $N_p$, a total number $N'_p$ of cores (hereinafter, referred to as a adding up number $N'_p$ of cores) required to process a job can be calculated by Equation (3):

$$N'_p = N_p + N_{Peq} \tag{3}$$

In this way, the job data block 600a is split into the first data block 602 and the second data block 604. Here, the size of the first data block 602 corresponds to the number of cores included in the CPU 402 of the slave node 300a, and the size of the second data block 604 corresponds to the conversion number of cores.

Figure 9:
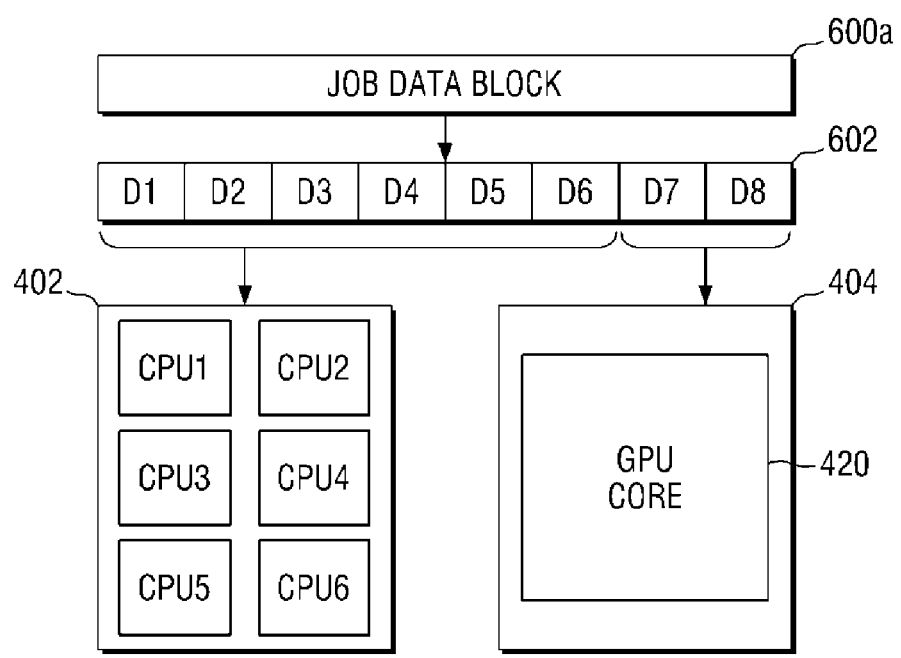
FIG. 9 illustrates a process of distributing input data to a CPU and a GPU according to an embodiment of the present invention.

FIG. 9 illustrates a process of distributing input data to a CPU and a GPU according to an embodiment of the present invention.

Referring to FIG. 9, according to the current embodiment of the present invention, a job data block 600a may be split into a number of job units data equal to the adding up number of cores. Then, a number of job units data equal to the number of cores included in a CPU 402 may be allocated to the CPU 402 of a slave node 300a, and a number of job units data equal to the conversion number of cores may be allocated to a GPU 404 of the slave node 300a. In some embodiments of the present invention, the slave node 300a may include a plurality of GPUs 404. In this case, the job units data equal to the conversion number of cores may be split into a plurality of data blocks whose sizes are respectively proportional to the numbers of processing blocks included in the GPUs 404, and the data blocks may be allocated to the GPUs 404, respectively.

Figure 10:
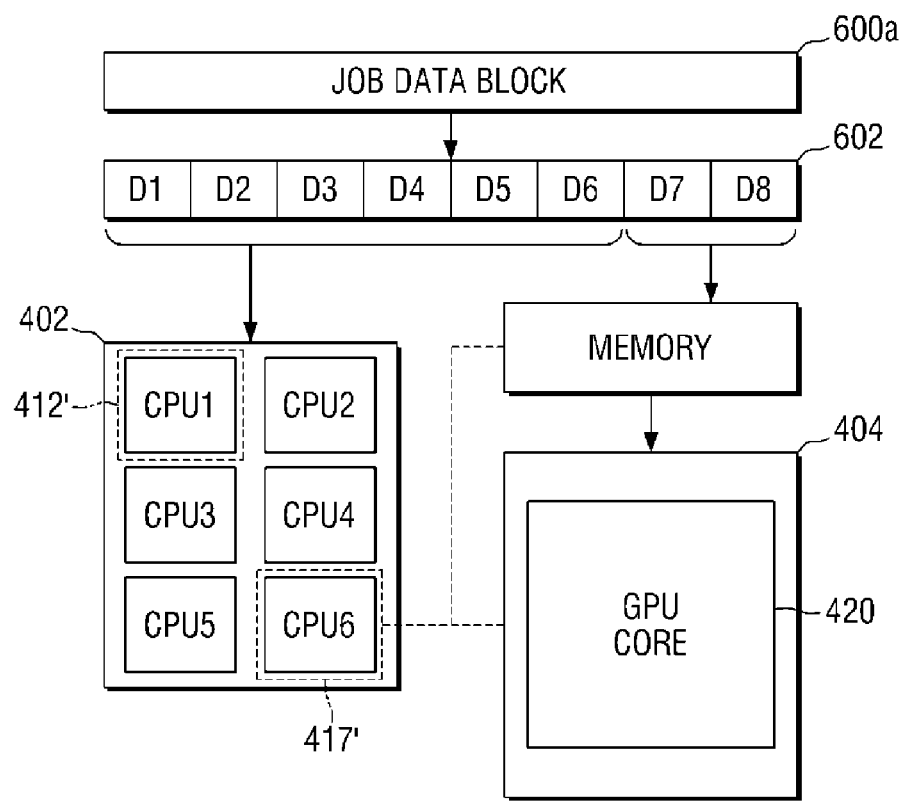
FIG. 10 illustrates a process of distributing input data to a CPU and a GPU according to anther embodiment of the present invention.

FIG. 10 illustrates a process of distributing input data to a CPU and a GPU according to anther embodiment of the present invention.

Referring to FIG. 10, in the current embodiment of the present invention, one of cores included in a CPU 402 of a slave node 300a may be a GPU control core 412' which performs a control operation of allocating job units data to a GPU 404. The GPU control core 412' may be excluded from the number of cores included in the CPU 402 and may not be allocated with a job data unit. In the current embodiment, one of the cores included in the CPU 402 of the slave node 300a may be a job units data distribution core 417' which performs a control operation of allocating job units data to other CPU cores.

Figure 11:
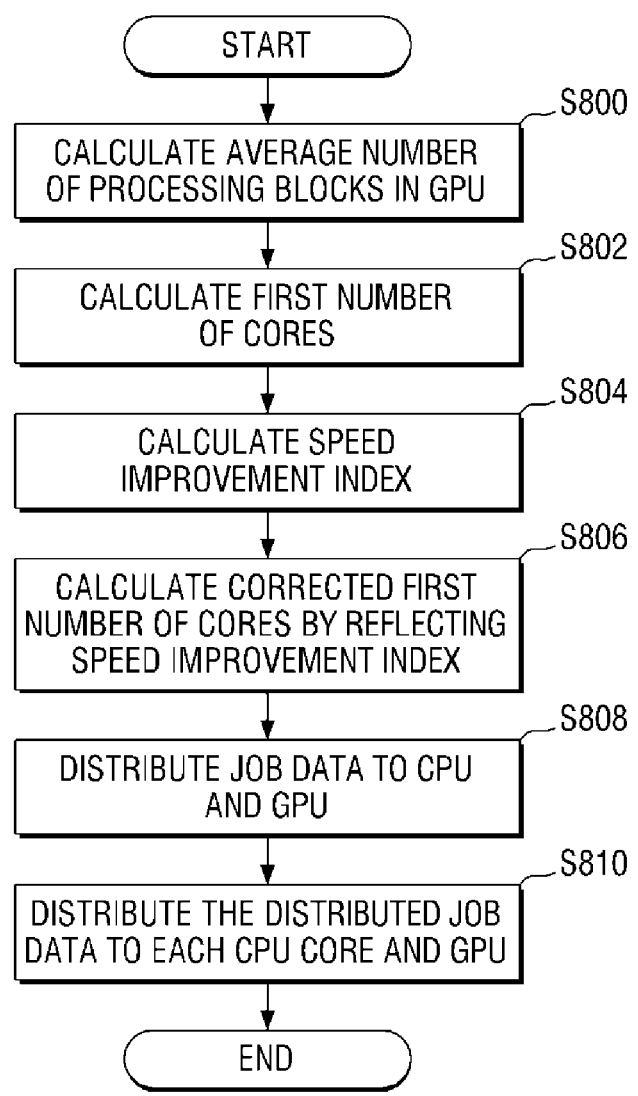
FIG. 11 is a flowchart illustrating a data processing method according to an embodiment of the present invention.

FIG. 11 is a flowchart illustrating a data processing method according to an embodiment of the present invention.

Referring to FIG. 11, the data processing method according to the current embodiment may include calculating an average number $G_{CAVG}$ of processing blocks included in one GPU 404 (operation S800), calculating a conversion number $GCI_{CAVG}$ of cores corresponding to the number of processing blocks included in the GPU 404 of a slave node 300a based on the average number $G_{CAVG}$ of processing blocks included in one GPU 404 (operation S802), calculating a speed improvement index PI indicating the degree of improvement in the processing speed of the GPU 404 by comparing the processing speed of a CPU 402 and the processing speed of the GPU 404 for the same job data (operation S804), calculating the corrected conversion number $N_{Peq}$ of cores by reflecting the conversion number $GCI_{CAVG}$ of cores and the speed improvement index PI (operation S806), and distributing a job data block between the CPU 402 and the GPU 404 (operation S808).

In some embodiments of the present invention, the data processing method may include distributing the job data block, which has been distributed between the CPU 402 and the GPU 404, to each core of the CPU 402 and the GPU 404 (operation S810). Specifically, a job data block 600a may be split into a number of job units data equal to the adding up number of cores. Then, a number of job units data equal to the number of cores included in the CPU 402 may be allocated to the CPU 402 of the slave node 300a, and a number of job units data equal to the conversion number of cores may be allocated to the GPU 404 of the slave node 300a. In some embodiments of the present invention, the slave node 300a may include a plurality of GPUs 404. In this case, the job units data equal to the conversion number of cores may be split into a plurality of data blocks whose sizes are respectively proportional to the numbers of processing blocks included in the GPUs 404, and the data blocks may be allocated to the GPUs 404, respectively.

Figure 12:
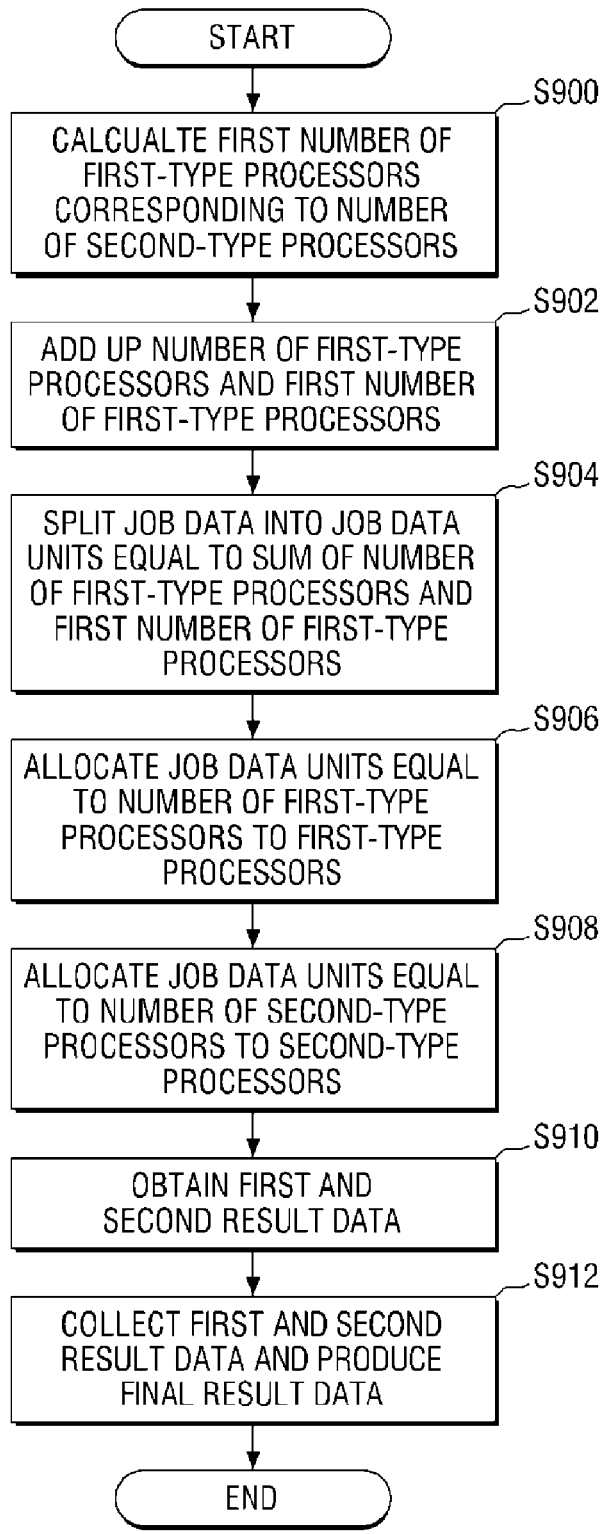
FIG. 12 is a flowchart illustrating a data processing method according to another embodiment of the present invention.

FIG. 12 is a flowchart illustrating a data processing method according to another embodiment of the present invention.

Referring to FIG. 12, the data processing method according to the current embodiment may include calculating a conversion number of first-type processors corresponding to the number of second-type processors included in a node of a distributed system (operation S900), calculating a adding up number of first-type processors by adding up the number of first-type processors included in the node of the distributed system and the conversion number of first-type processors (operation S902), splitting job data allocated to the node of the distributed system into a number of job units data equal to the adding up number of first-type processors (operation S904), allocating a number of job units data equal to the number of first-type processors included in the node of the distributed system to the first-type processors of the node of the distributed system (operation S906), and allocating a number of job units data equal to the conversion number of first-type processors to the second-type processors of the node of the distributed system (operation S908).

Here, the job units data equal to the conversion number of the first-type processors are split into a plurality of data blocks whose sizes are respectively proportional to throughputs of the second-type processors per unit of time, and the data blocks are allocated to the second-type processors, respectively.

The method may further include obtaining first result data by processing some of the job units data using the first-type processors and obtaining second result data by processing the other ones of the job units data using the second-type processors (operation S910) and producing final result data by collecting the first result data and the second result data (operation S912).

According to various embodiments of the present invention, there is no need to add a new node to a cluster in order to implement distributed computing. Instead, the processing speed of a large amount of data (e.g., big data) can be increased by using a GPU included in an existing node as a general purpose GPU (GPGPU). Furthermore, a policy for distributing a job between a CPU and a GPU according to various embodiments of the present invention can be effectively used without an additional modification even when a new GPU node is added to the cluster.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A data processing method comprising:
   calculating a conversion number of cores corresponding to a number of processing blocks included in a graphics processing unit (GPU) of a node of a distributed system;
   adding a number of cores included in a central processing unit (CPU) of the node, and the conversion number of cores, to provide an adding-up number of cores;
   splitting job data, allocated to the node into a number, of job units of data, equal to the adding-up number of cores;
   allocating to the CPU of the node a number of job units of data equal to the number of cores included in the CPU; and
   allocating to the GPU of the node a number of job units of data equal to the conversion number of cores.

2. The data processing method of claim 1, further comprising:
   determining an average number of processing blocks included in one GPU;
   providing a core table showing the number of cores included in one CPU based on the average number of processing blocks; and
   calculating the conversion number of cores with reference to the core table.

3. The data processing method of claim 1, wherein:
   the calculating of the conversion number of cores further comprises calculating a corrected conversion number of cores by reflecting a weight, allocated to the GPU, according to attributes of the job data; and
   the calculating of the adding-up number of cores is performed using the corrected conversion number of cores as the conversion number of cores.

4. The data processing method of claim 3, wherein:
   the calculating of the corrected conversion number of cores further comprises calculating a speed improvement index;
   the speed improvement index indicates a degree of improvement in a processing speed of the GPU; and
   the calculating of the speed improvement index is performed by comparing the processing speed of the CPU and the processing speed of the GPU for the job data; and
   the reflecting of the weight, allocated to the GPU, is performed by weighting the calculated conversion number of cores using the speed improvement index.

5. The data processing method of claim 4, wherein the calculating of the speed improvement index is performed with reference to a speed improvement index table showing the weight according to a degree of improvement in the processing speed of the GPU.

6. The data processing method of claim 1, wherein:
   the allocating of the number of job units of data to the GPU of the node further comprises splitting the job units of data equal to the conversion number of cores into a plurality of data blocks;
   the plurality of data blocks have sizes respectively proportional to the number of processing blocks included in the GPUs; and
   the allocating of the number of job units of data is performed by allocating the data blocks to the GPUs, respectively.

7. The data processing method of claim 1, further comprising performing a control operation of allocating the job units of data to the GPU using, as a GPU control core, one of the cores included in the CPU of the node.

8. The data processing method of claim 7, further comprising:
   excluding the GPU control core from the number of cores included in the CPU; and
   allocating the number of job units of data to the cores in the CPU of the node other than the GPU control core.

9. The data processing method of claim 1, further comprising performing a control operation of allocating the job units of data to the cores in the CPU using, as a job units of data distribution core, one of the cores included in the CPU of the node.

10. The data processing method of claim 9, further comprising:
    excluding the job units of data distribution core from the number of cores included in the CPU; and
    allocating the number of job units of data to the cores in the CPU of the node other than the job units of data distribution core.

11. A data processing method comprising:
    calculating a conversion number of first-type processors corresponding to a number of second-type processors included in a node of a distributed system;
    adding a number of first-type processors, included in the node, and the conversion number of first-type processors, to provide an adding-up number of first-type processors;
    splitting job data, allocated to the node into a number, of job units of data, equal to the adding-up number of first-type processors;
    allocating a number of job units of data, equal to the number of first-type processors included in the node, to the first-type processors of the node; and
    allocating a number of job units of data, equal to the conversion number of first-type processors, to the second-type processors of the node;
    wherein:
      the job units of data, equal to the conversion number of the first-type processors, are split into data blocks whose respective sizes are proportional to throughputs of the second-type processors on a per unit of time basis, and
      the data blocks are respectively allocated to the second-type processors.

12. The data processing method of claim 11, wherein the calculating of the conversion number of first-type processors comprises:
    calculating a corrected conversion number of first-type processors by reflecting a weight allocated to each second-type processor according to attributes of the job data of the conversion number of first-type processors, and calculating the adding-up number of the first-type processors comprises by using the corrected conversion number of first-type processors as the conversion number of first-type processors.

* * * * *